(12) United States Patent
Chrostowski

(10) Patent No.: US 9,215,842 B2
(45) Date of Patent: Dec. 22, 2015

(54) ADJUSTABLE MODULAR TINE MUCK AND GARDEN RAKE

(75) Inventor: Matthew Edward Chrostowski, Agoura Hills, CA (US)

(73) Assignee: Noble Rider, LLC, Modesto, CA (US)

( * ) Notice: Subject to any disclaimer, the term of this patent is extended or adjusted under 35 U.S.C. 154(b) by 306 days.

(21) Appl. No.: 13/361,898

(22) Filed: Jan. 30, 2012

(65) Prior Publication Data

US 2012/0193273 A1 Aug. 2, 2012

Related U.S. Application Data

(60) Provisional application No. 61/437,636, filed on Jan. 29, 2011.

(51) Int. Cl.
| | | |
|---|---|---|
| *B07B 1/49* | (2006.01) | |
| *A01D 7/08* | (2006.01) | |
| *A01D 11/06* | (2006.01) | |
| *A47L 25/00* | (2006.01) | |

(52) U.S. Cl.
CPC *A01D 7/08* (2013.01); *A01D 11/06* (2013.01); *A47L 25/00* (2013.01)

(58) Field of Classification Search
CPC ............. A01D 7/00; A01D 7/08; A01D 9/00; A01D 9/04; A01D 11/06; F24B 15/08; B07B 1/02

USPC .......... 209/417, 419, 418; 56/400.04, 400.21; 294/52, 50, 55.5, 59

See application file for complete search history.

(56) References Cited

U.S. PATENT DOCUMENTS

| | | | | |
|---|---|---|---|---|
| 1,474,650 A * | 11/1923 | Storr | ............................... | 294/52 |
| 2,490,710 A * | 12/1949 | Rugg | ........................ | 56/400.17 |
| 2,850,865 A * | 9/1958 | Anderson | .................. | 56/400.17 |
| 5,271,213 A * | 12/1993 | von Allwoerdan | ............. | 56/400 |
| 6,131,381 A * | 10/2000 | Milbury | ..................... | 56/400.17 |
| 6,199,357 B1 * | 3/2001 | Bloom | ........................... | 56/220 |
| 6,332,635 B1 * | 12/2001 | Harpell | ........................ | 294/53.5 |
| 7,222,899 B1 * | 5/2007 | Berto | ........................... | 294/55.5 |

\* cited by examiner

*Primary Examiner* — Joseph C Rodriguez
*Assistant Examiner* — Kalyanavenkateshware Kumar
(74) *Attorney, Agent, or Firm* — Thomas M. Freiburger

(57) ABSTRACT

The present invention relates primarily to an improvement in a mucking rake that can also be adapted for landscaping use. The invention possesses parallel replaceable tines that are spaced apart at variable distances through the use of individual modular tines and/or spacers. The tines can also be manufactured in a wavy shape to enable the debris to be sifted and collected onto the rake without having to dispose of the debris each time debris is sifted and collected.

20 Claims, 4 Drawing Sheets

ADJUSTABLE MODULAR TINE MUCK AND GARDEN RAKE

CROSS-REFERENCE TO RELATED APPLICATIONS

This Application claims the benefit of Provisional Patent Application Ser. No. 61/437,636.

BACKGROUND OF THE INVENTION

The invention generally relates to an improved mucking rake used in the farm and ranch fields, and in more particularity to a modular mucking rake.

Mucking rakes are a very common tool used in the farm and ranch fields. The rakes are made with multiple tines spaced apart in parallel from each other. These tines are spaced a fixed distance apart, narrow or wide, from each other. This allows material of multiple aggregates, such as saw dust, wood shavings, wood chips, sand and other types of bedding to pass through, while the manure and other larger material is caught in the rake and disposed of.

The wider the tines are spaced from each other, the more material falls through and is not collected. The narrower the tines are spaced to each other, the less material falls through the tines and more debris is collected. Currently, whoever wants a mucking rake must decide on whether to get a mucking rake with narrow or wide fixed spaced tines. These mucking rakes are made of unibody construction so there can be no changes once the rake is purchased.

While most mucking rakes are made of plastic, they are made out of metal for strength. As a result of the metal composition, mucking rakes with metal tines are heavy and burdensome. Plastic mucking rakes are not as strong as metal tines and tend to break more often. Should an individual plastic tine break, the rake is heavily compromised for its intended use and is ineffective. The individual raking with a broken tine would have to repeat the same areas that are already raked and items fall through the broken tine area. Essentially, should a single tine break the whole rake must be replaced.

Further, current mucking rake tines are straight. This requires the individual to take time to carefully sift through the material. The user must shake and sift the material through the rake first then take additional time to shake the rake some more in order to collect the material at the bottom of the rake if the user desires to retain some of the material collected in the rake.

Accordingly, it would be advantageous to have an inexpensive lightweight rake that incorporates individual modular tines that can be easily replaced if broken or damaged, can be variably spaced, and which can offer a variety of shapes and functions to act as an modular and interchangeable farming tool.

SUMMARY OF THE INVENTION

In accordance with one embodiment, a mucking rake comprises a handle, a modular rail bar attached to the handle and a plurality of modular replaceable tines attached to the modular rail bar in parallel with variable modular spacers and modular connectors between the modular replaceable tines. Additionally, the individual modular tines themselves can be of varying widths, to do without the modular spacers.

The replaceable modular tines result in a significant cost savings should a single tine be damaged or broken. Instead of having to replace the whole tool should a single tine be broken/damaged, the current invention only requires replacement of the single broken/damaged tine.

By also using individual tines, the users can also customize their tools through the use of multi-colored tines. Color tines can be utilized to help identify their personal belongings.

In accordance with another embodiment, a mucking rake comprises a handle, a modular rail bar attached to the handle and a plurality of modular replaceable tines attached to the modular rail bar in parallel with variable modular spacers and modular connectors between the modular replaceable tines, and an end cap or end wall on each end (left and right) of the tool to form a bucket type rake.

The end cap or wall on each end of the tool effectively allows the user to utilize more material to be placed on the tool.

In accordance with another embodiment a mucking rake comprises a handle, a modular rail bar attached to the handle and a plurality of modular replaceable wave shaped tines attached to the modular rail in parallel with modular spacers and modular connectors between the modular replaceable wave shaped tines.

By utilizing wave-shaped tines, the debris will more naturally settle at the bottom, in a trough defined by the tines, and require less shaking and work to move around. The wave shape causes debris to be sifted through the high and low of the wave shape assisting the sifting process, making it more efficient to scoop and sift, saving more of the bedding.

In accordance with another embodiment, a shovel comprises a handle, a modular rail bar attached to the handle and a modular attachment to the bar for receiving a shovel blade.

In accordance with another embodiment, a modular hoe comprises a handle, a modular rail bar attached to the handle and a modular attachment to the bar for receiving a hoe.

In accordance with another embodiment, a modular squeegee comprises a handle, a modular rail bar attached to the handle and a modular attachment to the bar for receiving a squeegee.

The modular attachment rail bar provides the user with multiple tools in one device. Instead of a separate shovel, hoe, squeegee and rake to scoop, sift, scrape and throw, the current invention accomplishes all of these functions.

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting in scope, the invention in its presently understood best mode for making and using the same will be described with additional specificity and detail through the use of the accompanying drawings in which:

DETAILED DESCRIPTION OF THE INVENTION

Figure 1:
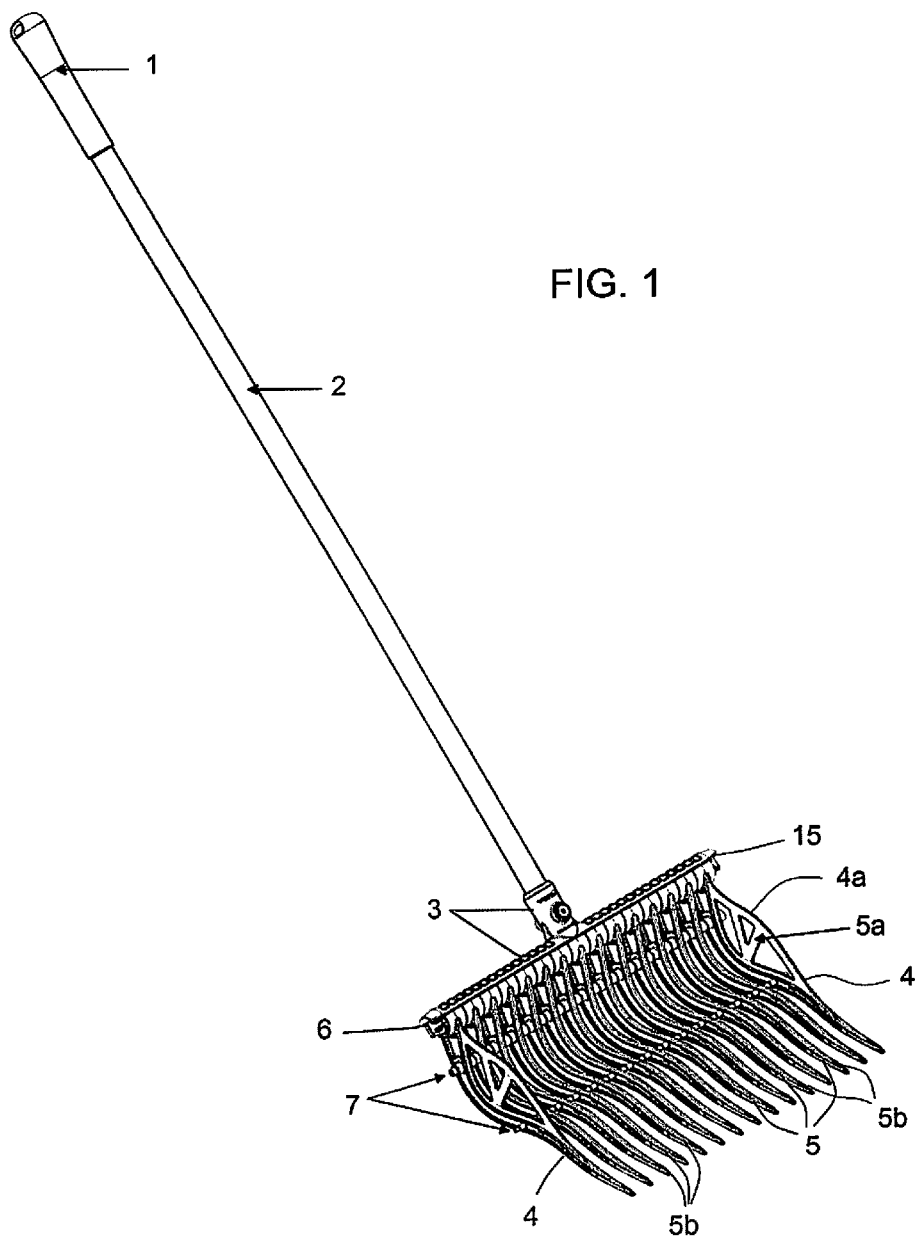
FIG. 1 is a perspective view of the assembled rake with end caps or end walls.

FIG. 1 shows a perspective view of the invention fitted as an adjustable modular tine muck and garden rake. As shown in FIG. 1, the invention permits an individual to use a mucking rake by grabbing a grip 1 attached to one end of a rigid handle 2. As displayed in FIG. 1, a rigid bar 3 is attached to the opposite end of the handle 2. Attached at each end of the rigid bar 3 are two special tines that serve as end caps or end walls 4 in order to better collect debris.

Between the two special tines or end walls 4 along the bar 3 are a series of modular wave shaped tines 5, and the special tines 4 have a similar shape, each also including a wall 4a to provide an edge barrier. The wave shape of the tines allows a user to collect and sift more easily as the debris will naturally collect at the lower portion of the tines 5. A trough is formed at 5a by the wave of the tines 5. In the embodiment illustrated, a total of 15 tines are included, 13 of them being the tines 5 and two being the special tines 4.

The tines 5 are stacked together laterally on the bar 3 and are held together to each other by means of locking clips 6 on each of left and right ends of the bar 3, as well as by interlinking means, i.e., interlinking connectors 7 along transverse lines farther down the tines as shown. The interlinking connectors also act as spacers acting along lines parallel to and distant from the bar 3.

Figure 2:
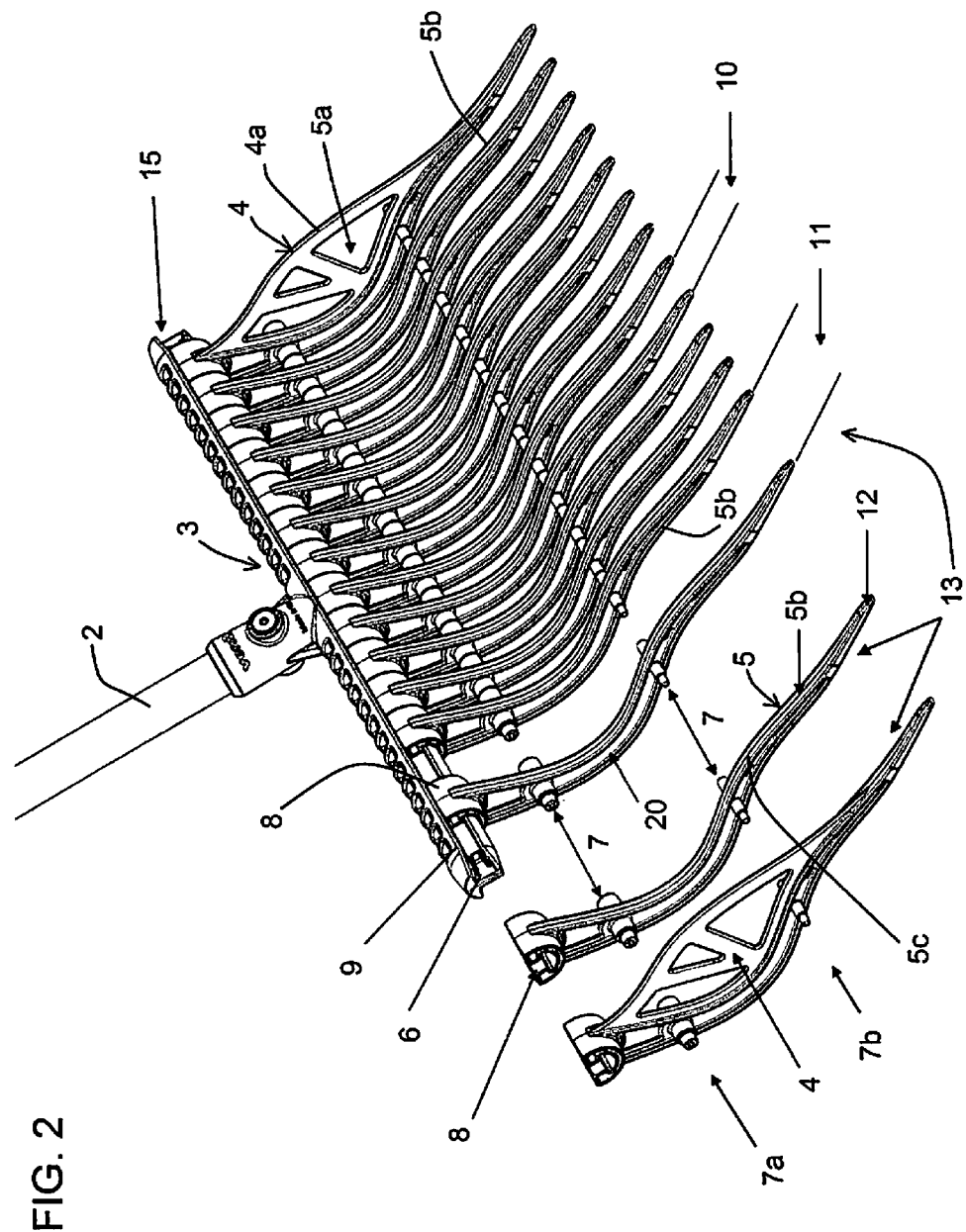
FIG. 2 is an exploded view of the rake, rail, tines and end walls.

As shown in FIG. 2, the tines 4 and 5 possess modular upper ends or base ends 8 that permit the tine 5 to slide laterally along a modular rail 9 of the bar 3.

The tines 5 can be manufactured to possess narrow spacing widths 10 or manufactured with larger spacing widths as indicated at 11 depending on the aggregates the individual user is dealing with. The tine upper ends 8 preferably have a specific width as manufactured, as do the interlinking connectors 7, defining the spacing. These can be varied to provide different spacing for rake fingers 5b that extend forward from the tine bases or upper ends 8. The drawings show that these interlinking connectors 7 are positioned in two parallel laterally extending lines in the assembled modular rake, i.e. at two different positions down the tine fingers, these positions being the same for each tine of a set. One line of interlinking connectors/spacers is at 7a in FIG. 2, a short distance down or forward from the tine upper end. A second line 7b of interlinking connectors/spacers 7 is farther down or forward on the tines, roughly about halfway through the length of the tines as shown, and slightly back from a high point or ridge 5c in the wave shape defined by the tines. As can be seen from FIGS. 2 and 3, the interlinking connectors/spacers in this preferred embodiment are comprised of a larger cylinder 7c from which extends a smaller cylinder or nipple 7d at one side of each connector/spacer. When the tines are brought together and stacked side-by-side, as can be envisioned from FIGS. 2 and 3, the nipple 7d of one connector fits into an adjacent barrel or cylinder end 7e of the adjacent connector/spacer, on the adjacent tine finger. As explained above, if desired the invention can employ modular spacers which are separate from the interlinking connectors, the spacers allowing tine spacing adjustment, and also can employ modular spacers to establish desired spacing between the modular replaceable tines.

On the lower end of each tine 4 or 5, the tine is tapered to a narrow edge at 12 (narrow both vertically and horizontally) to enable the user to scoop much more easily.

Figure 4:
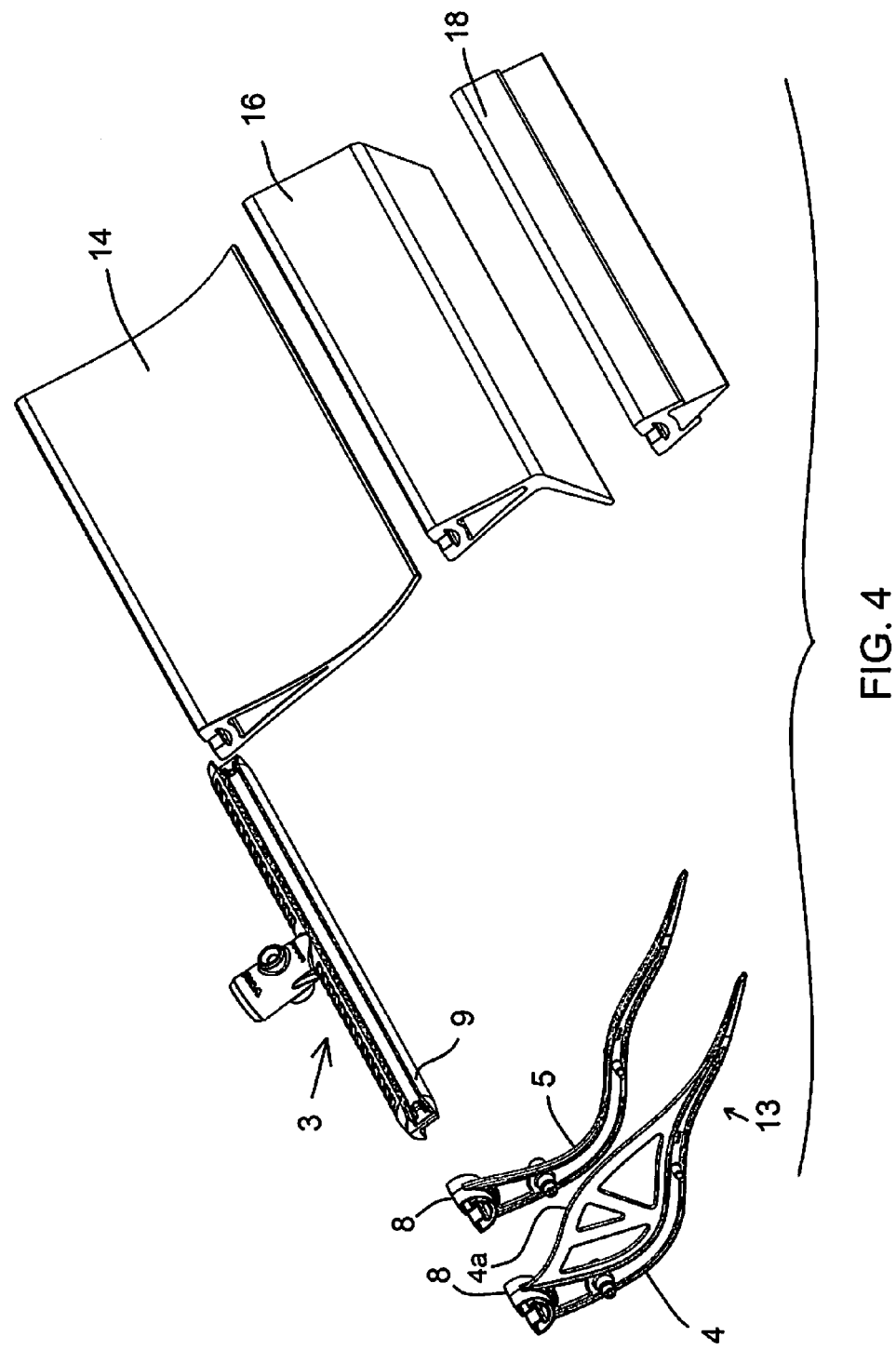
FIG. 4 is an exploded view showing interchangeable working tool ends or tool heads.

The invention can be used for other toolsets, i.e. other working tool ends or heads, such as shovels, hoes, or squeegees, just by slipping the toolsets 13 comprising the rake tines 5 off the rail 9 and sliding onto the rail another desired toolset, i.e. a shovel 14, a hoe 16 or a squeegee 18 as schematically indicated in FIG. 4. These can be secured by the locking clips 6.

While manufacturing the tines 4, 5 individually, with their modular upper ends 8, provides much more strength than that found on a unibody constructed mucking rake, the tines 4, 5 can be further strengthened by incorporating an I-beam cross section 20 into the tine design. The I-beam cross section is defined by upper and lower flanges 22 and 24 and a web 26 between them, each web 26 being in a plane perpendicular to the length of the bar 3. The webs 26 are shown open at 28, near the modular upper ends 8. See FIG. 3.

Figure 3:
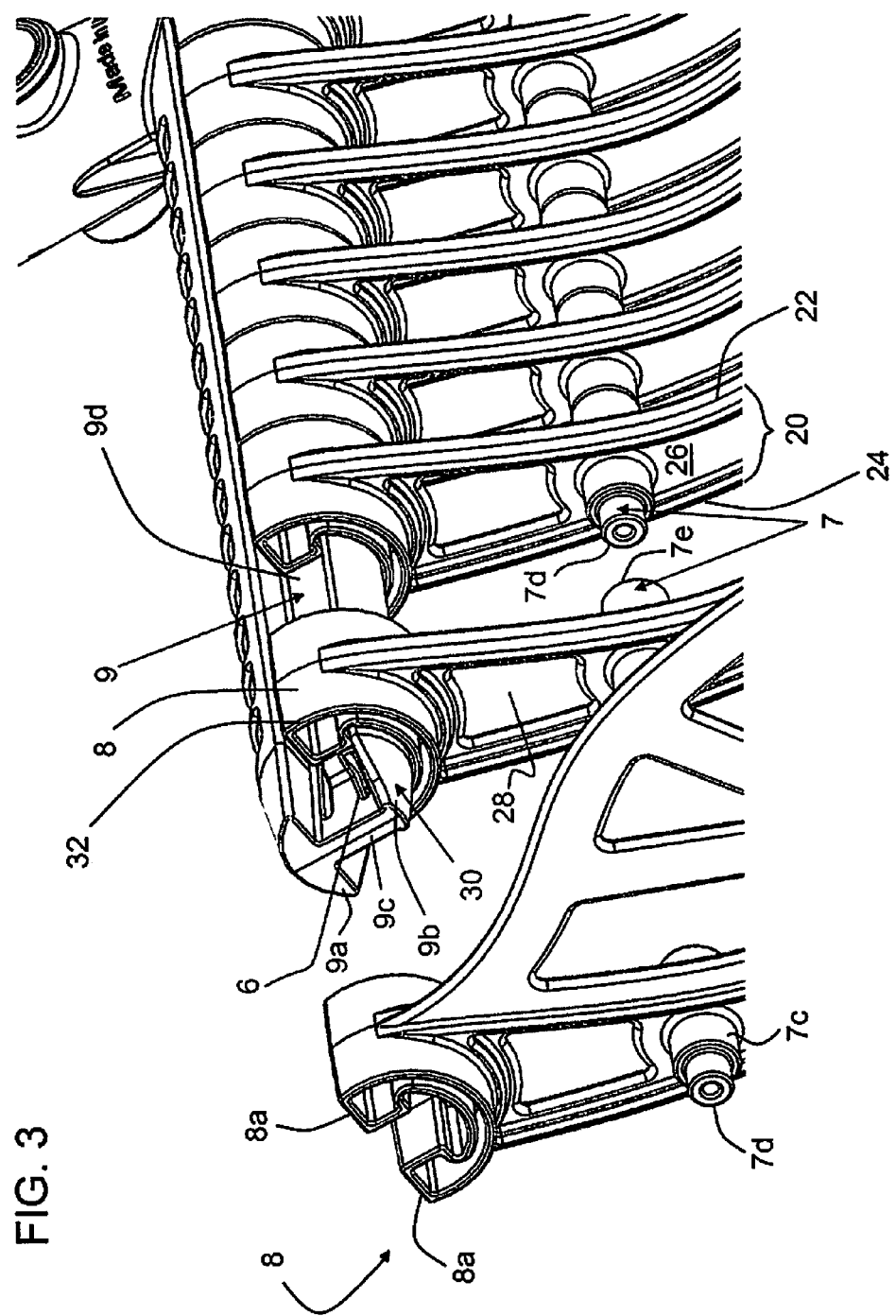
FIG. 3 is an exploded sectional view of the rail, tines and locking clips.

FIG. 3 shows more detail and gives more insight of how the modular upper tine end 8 slides over the illustrated locking clip 6 and onto the rail 9 by utilizing a tapered end 30 of the rail bar. The tapered end of the rail 9 allows easy insertion of the modular ends 8.

All of the generally C-shaped modular upper ends 8 slide over the tapered end 30 of the rail 9 and are held securely by the raised inside portion of the clip against the side edge 32 of the modular upper end. As shown, the rail 9 can be generally of an I-beam shape, with upper and lower flanges 9a and 9b and a central wall or web 9c. This forms opposed channels 9d into which enlarged tips 8a of the capital C-shaped upper or base ends 8 of the tines slide and closely engage, keying into the channels for a strong connection to resist rotation of tines relative to the bar. The interior curve of the C-shaped end is shaped to mate with the similar shape of the bottom of the I-beam as shown in the drawings.

The invention claimed is:

1. A modular toolset for agriculture and landscape work, comprising:
   a handle having upper and lower ends, with a grip near the upper end,
   a bar secured to the lower end of the handle and having a length oriented perpendicular to the handle,
   the bar including a modular elongated rail having a specific non-circular elongated cross-sectional shape extending laterally, perpendicular to the handle to receive by laterally sliding motion working tool end components onto the bar in a manner firmly retaining a tool end on the bar, said non-circular cross-sectional shape resisting rotation of the tool end relative to the bar,
   a series of individual, separately formed modular tines making up a working tool end, the modular tines being slidable laterally on and retained on the modular rail in side-by-side relationship, laterally stacked together along the modular rail, each tine having an upper end or base end with a non-circular cross-sectional shape that is complementary to the cross-sectional shape of the modular rail so as to fit closely on the modular rail for secure and non-rotational connection on the rail while permitting lateral sliding, and the upper or base ends of the tines having a lateral width establishing a spacing between forwardly extending fingers of adjacent tines, and
   the finger of each tine including, at a similar position on each tine spaced down the finger and away from the upper or base end, interlinking means for linking the fingers along a lateral line parallel to the bar,
   whereby the tines are removable and replaceable, and a tine if broken can be removed from the bar and replaced.

2. The modular toolset of claim 1, wherein the interlinking means comprises, on each tine finger, an interlinking spacer member extending laterally, engaged with an interlinking spacer member of an adjacent tine so as to maintain the fingers of the series of tines at the said spacing established at the upper ends of the tines and interlinking the tine fingers at the locations of the interlinking spacer members.

3. The modular toolset of claim 2, including two said interlinking spacer members on each tine, one near the upper end of the tine and another being forward on the tine, more distant from the upper end of the tine, forming two said lateral lines of interlinking parallel to the bar.

4. The modular toolset of claim 3, wherein the tine fingers are wave shaped, defining a trough near the tine upper ends in the assembled toolset and defining a high point or ridge in the tine fingers, the high point or ridge being just forward of said other interlinking spacer members.

5. The modular toolset of claim 1, wherein the tine fingers are wave shaped, defining a trough near the tine upper ends in the assembled toolset and defining a high point or ridge in the tine fingers, the high point or ridge being just forward of said interlinking means.

6. The modular toolset of claim 2, wherein the modular tines include special left and right outer tines that include end walls extending up from the fingers to enclose said trough at left and right ends.

7. The modular toolset of claim 1, wherein the modular tines include special left and right outer tines that include end walls extending upwardly from the fingers.

8. The modular toolset of claim 1, including means for retaining the modular tines from escaping laterally from the modular rail.

9. The modular toolset of claim 1, wherein the interlinking means comprises an interlinking spacer member on each tine finger, the interlinking spacer members being interlinked by a nipple on one spacer member extending into an opening of an adjacent spacer member.

10. The modular toolset of claim 1, wherein the tine fingers are wave shaped, defining a trough near the tine upper ends in the assembled toolset and defining a high point or ridge in the tine fingers.

11. The modular toolset of claim 1, further including a shovel blade having an upper end with said cross-sectional shape complementary to the cross-sectional shape of the modular rail, whereby the shovel blade can be substituted for the series of tines.

12. The modular toolset of claim 1, further including a hoe blade having an upper end with said cross-sectional shape complementary to the cross-sectional shape of the modular rail, whereby the hoe blade can be substituted for the series of tines.

13. The modular toolset of claim 1, further including a squeegee blade having an upper end with said cross-sectional shape complementary to the cross-sectional shape of the modular rail, whereby the squeegee blade can be substituted for the series of tines.

14. The modular toolset of claim 1, further including a plurality of working tool ends, in addition to and as replacements for the series of tines.

15. The modular toolset of claim 1, wherein the tine fingers have a generally I-beam shape in cross section.

16. The modular toolset of claim 1, wherein the modular rail of the bar has essentially an I-beam cross-sectional shape, and with the tine upper ends being generally C-shaped to engage slidingly on the modular rail, with tips of the C-shaped upper ends engaging in two opposed channels defined by the essentially I-beam shaped modular rail.

17. A modular toolset for agriculture and landscape work, comprising:
  a handle having upper and lower ends, for gripping by a user,
  a bar secured to the lower end of the handle and having a length oriented perpendicular to the handle,
  the bar including a modular elongated rail having a specific non-circular elongated cross-sectional shape extending laterally, perpendicular to the handle, to receive by laterally sliding motion working tool end components onto the bar in a manner firmly retaining a tool end on the bar, said non-circular cross-sectional shape resisting rotation of the tool end relative to the bar,
  a series of individual, separately formed modular tines making up a working tool end, the modular tines being individually slidable laterally on and retained on the modular rail in aligned relationship along the bar, each tine having an upper end or base end with a non-circular cross-sectional shape that is complementary to the cross-sectional shape of the modular rail so as to fit closely on the modular rail for secure and non-rotational connection on the rail while permitting lateral sliding, and the upper or base ends of the tines having a lateral width providing a separation between forwardly extending fingers of adjacent tines, and
  the finger of each tine including, at a similar position on each tine spaced down the finger and away from the upper or base end, releasable interlinking means for linking the fingers along a lateral line parallel to the bar,
  whereby the tines are removable and replaceable, and a tine if broken can be removed from the bar and replaced.

18. The modular toolset of claim 17, wherein the tine fingers are wave shaped, defining a trough near the tine upper ends in the assembled toolset and defining a high point or ridge in the tine fingers, the high point or ridge being just forward of said interlinking means.

19. The modular toolset of claim 17, wherein the modular tines include special left and right outer tines that include end walls extending up from the fingers to enclose said trough at left and right ends.

20. The modular toolset of claim 17, wherein the tine fingers have a generally I-beam shape in cross section.

* * * * *